US011099269B2

(12) United States Patent
Lim et al.

(10) Patent No.: US 11,099,269 B2
(45) Date of Patent: Aug. 24, 2021

(54) RADAR DEVICE FOR VEHICLE AND TARGET DETERMINATION METHOD THEREFOR

(71) Applicant: MANDO CORPORATION, Pyeongtaek-si (KR)

(72) Inventors: HaeSueng Lim, Yongin-si (KR); JaeEun Lee, Seoul (KR); Seong Hee Jeong, Yongin-si (KR)

(73) Assignee: MANDO CORPORATION, Pyeonotaek-si (KR)

( * ) Notice: Subject to any disclaimer, the term of this patent is extended or adjusted under 35 U.S.C. 154(b) by 770 days.

(21) Appl. No.: 15/355,057

(22) Filed: Nov. 18, 2016

(65) Prior Publication Data

US 2017/0146648 A1    May 25, 2017

(30) Foreign Application Priority Data

Nov. 19, 2015  (KR) ......................... 10-2015-0162536

(51) Int. Cl.
*G01S 13/58* (2006.01)
*G01S 13/34* (2006.01)
*G01S 7/35* (2006.01)
*G01S 13/931* (2020.01)

(52) U.S. Cl.
CPC ............ *G01S 13/584* (2013.01); *G01S 7/352* (2013.01); *G01S 13/343* (2013.01); *G01S 13/345* (2013.01); *G01S 13/931* (2013.01)

(58) Field of Classification Search
CPC ...... G01S 13/584; G01S 7/352; G01S 13/343; G01S 13/345; G01S 13/931
See application file for complete search history.

(56) References Cited

U.S. PATENT DOCUMENTS

| 8,436,764 | B2* | 5/2013 | Reiher .................... G01S 7/354 |
| | | | 342/70 |
| 9,581,682 | B2* | 2/2017 | Jeong ........................ G01S 7/35 |
| 10,036,805 | B2* | 7/2018 | Lee .......................... G01S 13/32 |
| 2011/0122014 | A1* | 5/2011 | Szajnowski ............. G01S 7/023 |
| | | | 342/109 |
| 2011/0181456 | A1* | 7/2011 | Luebbert ............... G01S 13/343 |
| | | | 342/70 |

FOREIGN PATENT DOCUMENTS

KR    10-2014-0083709 A    7/2014

* cited by examiner

*Primary Examiner* — Erin F Heard
*Assistant Examiner* — Donald H B Braswell
(74) *Attorney, Agent, or Firm* — Hauptman Ham, LLP

(57) ABSTRACT

The disclosure relates to a radar device for a vehicle, enabling to determine a target satisfying a pairing condition for finding an intersection point by using a combination of a pair of up-chirp and down-chirp signals with an added down-chirp signal, without an additional hardware resource. The radar device includes at least: a transmission unit configured to transmit, through the transmission antenna, a transmission signal including a pair of up-chirp and down-chirp signals having predetermined slopes, and an added chirp signal having a slope different from the slopes; a reception unit configured to receive, through the reception antenna, a reception signal that is the transmission signal reflected on the target located before the vehicle; and a signal processing unit configured to determine the target satisfying the pairing condition for finding an intersection point through a combination of at least one of a pair of the up-chirp and down-chirp signals.

7 Claims, 9 Drawing Sheets

RADAR DEVICE FOR VEHICLE AND TARGET DETERMINATION METHOD THEREFOR

CROSS REFERENCE TO RELATED APPLICATION

This application claims priority from Korean Patent Application No. 10-2015-0162536, filed on Nov. 19, 2015, which is hereby incorporated by reference for all purposes as if fully set forth herein.

BACKGROUND OF THE INVENTION

1. Field of the Invention

The present disclosure relates to a radar device for a vehicle and a target determination method therefor and, more particularly, a radar device for a vehicle, enabling to determine, as an actual target, a target satisfying a pairing condition for finding an intersection point through a combination of a pair of up-chirp and down-chirp signals with an added down-chirp signal, without an additional hardware resource, and a target determination method therefor.

2. Description of the Prior Art

A general FMCW-type radar device for a vehicle acquires distance and velocity information using a frequency difference between a transmission signal which gradually changes over time and a reception signal which changes by a target. Here, since a demodulated signal has frequency variations generated by a distance and a velocity of a target mixed therein, a combination of an up-chirp in which a frequency gradually increases over time and a down-chirp in which a frequency gradually decreases over time is used in order to divide the mixed frequency variations so as to calculate the accurate distance and velocity of the target.

FIG. 1A is a diagram illustrating a transmission signal transmitted through a transmission antenna, and a reception signal that is the transmission signal reflected and returning from a target. FIG. 1B is a diagram illustrating a frequency difference between the transmission signal and the reception signal which are illustrated in FIG. 1A. The distance and velocity of the target are mathematically calculated based on the frequency difference between the transmission signal and the reception signal illustrated in FIG. 1B.

However, frequency variation by the distance of the target is determined to be in a specific direction and the frequency variation by the velocity of the target changes in two directions according to the positive (+) or negative (−) velocity. Therefore, when a target that is within a close distance from a radar device and has a large velocity element is present, that is, when a vehicle approaching at a high speed in a short distance is present, there occurs a case of where a sum of frequency variation according to distance and frequency variation according to velocity has a negative value (−), as illustrated in FIG. 2. Accordingly, there may occur a problem of an undetected or mistakenly detected target approaching at a high speed in a short distance.

In addition, a conventional FMCW-type radar device for a vehicle has a problem that a ghost target is generated in a situation where a plurality of targets are present.

More specifically, referring to a graph illustrated in FIG. 3, which displays a relationship between a distance and a relative velocity which are measured or calculated for each chirp signal, a conventional FMCW-type radar device for a vehicle has a risk in that two additional ghost targets are generated in addition to two actual targets under a pairing condition in which a pair of an up-chirp signal (A) and a down-chirp signal (B) meet, so that the ghost targets directly affect a control.

Further, in a situation where a plurality of targets are present, a ghost target is recognized as an actual target in a tracking process when an occurrence frequency of a ghost target is high or ghost target information is continuous, and there is thus a risk of directly affecting a control.

CITATION LIST

Patent Document

Republic of Korea Patent Application Publication No. 2014-0083709 (2014 Jul. 4) entitled "Radar device and signal processing method applied thereto"

SUMMARY OF THE INVENTION

The purpose of the present disclosure is to provide a radar device for a vehicle, enabling to determine, as an actual target, a target satisfying a pairing condition for finding an intersection point through a combination of a pair of up-chirp and down-chirp signals with an added down-chirp signal, without an additional hardware resource, and a target determination method therefor.

An embodiment for achieving the purpose provides an FMCW-type radar device for a vehicle, including a transmission antenna and a reception antenna that are installed in a vehicle to detect a target located before the vehicle, the radar device for a vehicle, including: a transmission unit configured to transmit, through the transmission antenna, a transmission signal including a pair of up-chirp and down-chirp signals having predetermined slopes, and an added chirp signal having a slope different from the slopes; a reception unit configured to receive, through the reception antenna, a reception signal that is the transmitted transmission signal reflected and returning from the target located before the vehicle; and a signal processing unit configured to determine, as an actual target, a target satisfying a pairing condition for finding an intersection point through a combination of at least one of a pair of the up-chirp and down-chirp signals acquired using a frequency difference between the transmission signal and the reception signal with the added chirp signal.

The signal processing unit may include a calculation unit configured to calculate a frequency difference between the transmission signal through a pair of the up-chirp and down-chirp signals and the reception signal, frequency variation according to a distance of the target, and frequency variation according to a velocity of the target.

The signal processing unit may include: a determination unit configured to determine whether a sum of the calculated frequency variation according to the distance of the target and the calculated frequency variation according to the velocity of the target is less than zero; and a target determination unit configured to determine, as an actual target, a target satisfying a pairing condition for finding an intersection point at which the down-chirp signal meets the added down-chirp signal when the sum is less than zero, and determine, as an actual target, a target satisfying a pairing condition for finding an intersection point at which a pair of the up-chirp and down-chirp signals and the added down-chirp signal meet when the sum is greater than zero, based on the result of the determination by the determination unit.

The target determination unit may be configured to: measure a distance and a velocity of the target using a frequency difference between the transmission signal through a pair of the up-chirp and down-chirp signals and the reception signal, and a sum of frequency variation according to the distance of the corresponding target and frequency variation according to the velocity of the corresponding target when the sum is less than zero, in which the frequency variations are calculated through the added down-chirp signal; and measure a distance and a velocity of the target using a frequency difference between the transmission signal through a pair of the up-chirp and down-chirp signals and the reception signal, and a sum of frequency variation according to the distance of the corresponding target and frequency variation according to the velocity of the corresponding target when the sum is greater than zero.

In addition, another embodiment provides a target determination method for an FMCW-type radar device for a vehicle, including a transmission antenna and a reception antenna that are installed in a vehicle to detect a target located before the vehicle, the target determination method for a radar device for a vehicle, including: transmitting, through the transmission antenna, a transmission signal including a pair of up-chirp and down-chirp signals having predetermined slopes, and an added chirp signal having a slope different from the slopes; receiving, through the reception antenna, a reception signal that is the transmission signal reflected and returning from the target located before the vehicle, in which the transmission signal is transmitted through the transmission antenna; and determining, as an actual target, a target satisfying a pairing condition for finding an intersection point through a combination of at least one of a pair of the up-chirp and down-chirp signals acquired using a frequency difference between the transmitted transmission signal and the received reception signal with the added chirp signal.

Determining the target as an actual target may include: determining whether a sum of frequency variation according to the distance of the target and frequency variation according to the velocity of the target is less than zero, in which the frequency variations are calculated through a pair of the up-chirp and down-chirp signals; and determining, as an actual target, a target satisfying a pairing condition for finding an intersection point at which the down-chirp signal meets the added down-chirp signal when the sum is less than zero, and determining, as an actual target, a target satisfying a pairing condition for finding an intersection point at which a pair of the up-chirp and down-chirp signals and the added down-chirp signal meet when the sum is greater than zero, based on the result of determining whether the sum is less than zero.

Determining the target as an actual target may include: measuring a distance and a velocity of the target using a frequency difference between the transmission signal through a pair of the up-chirp and down-chirp signals and the reception signal, and a sum of frequency variation according to the distance of the corresponding target and frequency variation according to the velocity of the corresponding target when the sum is less than zero, in which the frequency variations are calculated through the added down-chirp signal; and measuring a distance and a velocity of the target using a frequency difference between the transmission signal through a pair of the up-chirp and down-chirp signals and the reception signal, and a sum of frequency variation according to the distance of the corresponding target and frequency variation according to the velocity of the corresponding target when the sum is greater than zero.

According to an embodiment of the present disclosure, without an additional hardware resource, a target satisfying a pairing condition for finding an intersection point through a combination of a pair of up-chirp and down-chirp signals with an added down-chirp signal can be determined to be an actual target. Accordingly, a problem of detecting two or more ghost targets added by two or more targets, which is generated due to a conventional pairing condition for finding an intersection point through a combination of a pair of up-chirp and down-chirp signals, can be solved.

Specifically, an occurrence frequency of a ghost target can be reduced through an enhanced pairing condition for finding an intersection through a combination of a down-chirp signal and an added down-chirp signal, in an emergency braking situation in which a near target suddenly approaches.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, a preferable embodiment of the present disclosure is described in detail with reference to accompanying drawings.

Figure 4:
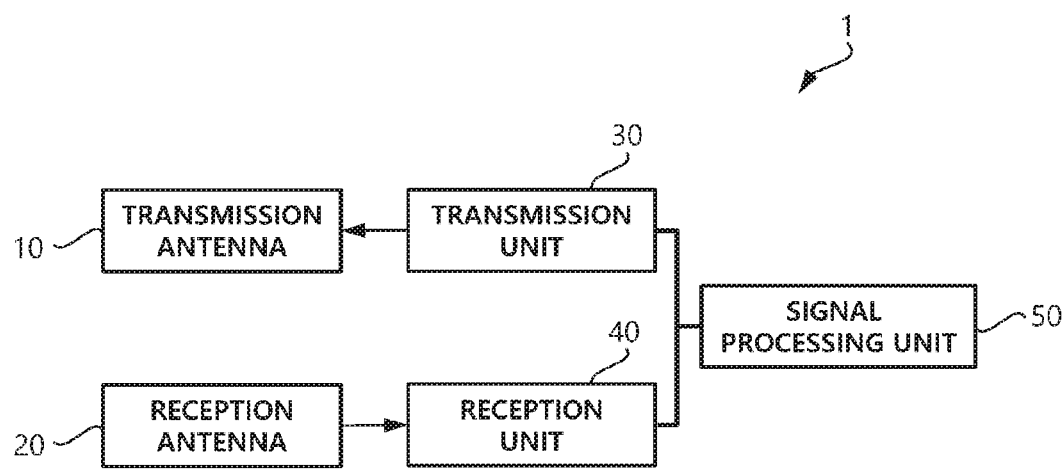
FIG. 4 is diagram for describing a radar device for a vehicle according to an embodiment.
Figure 5:
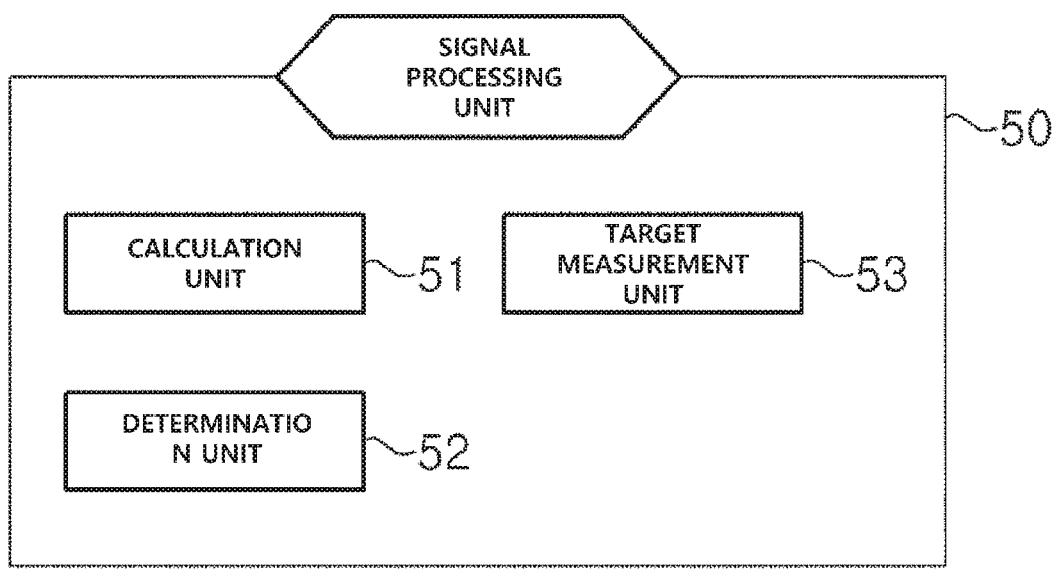
FIG. 5 is diagram for describing the signal processing unit illustrated in FIG. 4.

FIG. 4 illustrates a diagram for describing a radar device for a vehicle according to an embodiment, and FIG. 5 illustrates a diagram for describing the signal processing unit illustrated in FIG. 4.

Referring to FIG. 4, a radar device 1 for a vehicle according to an embodiment may be installed in the front side of a vehicle so as to detect a target located before the vehicle.

Such a radar device 1 for a vehicle may be a Frequency Modulation Continuous Wave (FMCW)-type radar device for a vehicle and include a transmission antenna 10, a reception antenna 20, a transmission unit 30, a reception unit 40, and a signal processing unit 50.

The transmission unit 30 transmits, through the transmission antenna 10, a pair of up-chirp and down-chirp signals and an added chirp signal.

The above described transmission unit 30 transmits, through the transmission antenna 10, a transmission signal including: a pair of chirp signals that are an up-chirp signal and a down-chirp signal, to which a sweep time is configured in order to improve accuracy of the velocity of the target; and an added chirp signal having a slope different from slopes of a pair of the chirp signals.

Meanwhile, the added chirp signal described above may be a down-chirp signal. In this case, a period of the down-chirp signal that is the added chirp signal may be configured to be one-half of a period of a pair of the up-chirp and down-chirp signals described above. In addition, a period may mean a repetition interval of a chirp signal having the same FMCW waveform. For example, a period of a pair of chirp signals means a time during which one down-chirp signal and one down-chirp signal are transmitted. For example, a period of a pair of chirp signals may mean a time interval during which a transmission chirp signal repeats an up-chirp and a down-chirp and transmits the same frequency. In addition, a period of a pair of chirp signals may mean a time during which a change from the maximum frequency to the minimum frequency occurs within a frequency variation range when the added chirp signal is a down-chirp signal.

Therefore, the period of the added down-chirp signal and each period of the up-chirp signal and the down-chirp signal included in a pair of the chirp signals may all be the same. That is, periods of three chirp signals may be configured to be the same. Meanwhile, a frequency modulation range of a pair of the up-chirp and down-chirp signals may be configured to be narrower than a frequency modulation range of the added down-chirp signal. Therefore, the added down-chirp signal may have a period which is one-half of a period of a pair of the chirp signals and have a frequency modulation range configured to be wide, so that an absolute value of a frequency change slope over time may be configured to be greater than an absolute value of a slope of the down-chirp signal included in a pair of the chirp signals.

The present specification provides an example in which an added chirp signal is a down-chirp signal, but an added chirp signal may be an up-chirp signal. If an added chirp signal is an up-chirp signal, the added down-chirp signal in the present specification may be changed to an added up-chirp signal and applied. However, a pairing condition may be configured to find an intersection point of an up-chirp signal of a pair of the chirp signals.

Hereinafter, an example in which an added chirp signal is a down-chirp signal is provided for explanation.

Here, a pair of the chirp signals correspond to a pair of FMCW waveforms including an up-chirp that is a waveform in which frequency linearly increases as time increases and a down-chirp that is a waveform in which frequency linearly decreases as time increases, relatively. The reception unit 40 receives, through the reception antenna 20, a reception signal that is a pair of the up-chirp and down-chirp signals reflected and returning from the target located ahead.

The above described reception unit 40 receives, through the reception antenna 20, a reception signal that is a transmission signal reflected and returning from a target located before a vehicle, in which the transmission signal is transmitted through the transmission antenna 10. Here, the reception unit 40 receives, through the reception antenna 20, a signal in which a time delay corresponding to a round-trip distance of the target and a frequency shift according to a relative velocity of the target have occurred.

The signal processing unit 50 may determine, as an actual target, a target satisfying a pairing condition for finding an intersection point through a combination of a pair of the up-chirp and down-chirp signals acquired using a frequency difference between the transmission signal and the reception signal with an added down-chirp signal, and measure a distance and a velocity of the determined actual target.

Here, in a condition where a sum of frequency variation according to the distance of the target and frequency variation according to the velocity of the target is less than zero, in which the frequency variations are calculated through a pair of the up-chirp and down-chirp signals, that is, when the target approaches at a high speed in a short distance, a velocity element is large so that the sum of frequency variation according to the distance of the target and frequency variation according to the velocity of the target has a negative (−) frequency value.

Accordingly, when the sum of frequency variation according to the distance of the target and frequency variation according to the velocity of the target is less than zero, in which the frequency variations are calculated through a pair of the up-chirp and down-chirp signals, the signal processing unit 50 may determine, as an actual target, a target satisfying a pairing condition for finding an intersection point at which the down-chirp signal meets the added down-chirp signal so as to secure a detection performance of the target approaching at a high speed in a short distance.

In a condition where a sum of frequency variation according to the distance of the target and frequency variation according to the velocity of the target is greater than zero (alternatively, a condition where the sum is equal to or greater than zero), in which the frequency variations are calculated through a pair of the up-chirp and down-chirp signals, that is, in a general driving environment, the signal processing unit 50 determines, as an actual target, a target satisfying a pairing condition for finding an intersection point at which a pair of the up-chirp and down-chirp signals and the added down-chirp signal meet.

Accordingly, due to the pairing condition for finding an intersection point at which a pair of the up-chirp and down-chirp signals and the added down-chirp signal meet, the probability of ghost occurrence may be reduced in comparison with a conventional pairing condition for finding an intersection point at which a pair of up-chirp and down-chirp signals meet.

A pair of the up-chirp and down-chirp signals described above have gentle slopes in order to improve accuracy of the velocity of the target. Here, the longer the length of the time axis of a pair of the up-chirp and down-chirp signal is, the better accuracy of the velocity of the target is. Therefore, it is preferable that the slopes of a pair of the up-chirp and down-chirp signals are determined to have a long time axis.

The added down-chirp signal described above has a steep slope that is a slope different from the slope of the down-chirp signal of a pair of the up-chirp and down-chirp signals.

Referring to FIG. 5, the signal processing unit 50 includes a calculation unit 51, a determination unit 52, and a target determination unit 53. The calculation unit calculates a frequency difference between a transmission signal including a pair of up-chirp and down-chirp signals transmitted by the transmission unit 30 and a reception signal including a pair of the up-chirp and down-chirp signals reflected on a target and received by the reception unit 40, frequency variation according to a distance of the target, and frequency variation according to a velocity of the target.

In addition, the calculation unit 51 calculates a frequency difference between a transmission signal that is an added down-chirp signal transmitted by the transmission unit 30 and a reception signal that is the added down-chirp signal reflected on the target and received by the reception unit 40, frequency variation according to a distance of the target, and frequency variation according to a velocity of the target.

The determination unit 52 determines whether a sum of frequency variation according to the distance of the target and frequency variation according to the velocity of the target is less than zero, in which the frequency variations are calculated through a pair of the up-chirp and down-chirp signals. That is, in a case where a vehicle approaches at a high speed in a short distance, a velocity element is large so that the sum of frequency variation according to the distance of the target and frequency variation according to the velocity of the target has a negative (−) frequency value.

Based on the result of the determination by the determination unit 52, the target determination unit 53: determines an actual target under a pairing condition for finding an intersection point at which the down-chirp signal meets the added down-chirp signal when a sum of frequency variation according to the distance of the target and frequency variation according to the velocity of the target is less than zero; and determines an actual target under a pairing condition for finding an intersection point at which a pair of the up-chirp and down-chirp signals and the added down-chirp signal meets when a result of the determination by the determination unit 52 shows that the sum of the frequency variations is greater than zero (alternatively, a case of where the sum is equal to or greater than zero).

Further, the target determination unit 53: measures a distance and a velocity of the target using a frequency difference between the transmission signal calculated through a pair of the up-chirp and down-chirp signals and the reception signal, and a sum of frequency variation according to the distance of the target and frequency variation according to the velocity of the target when the sum of frequency variation according to the distance of the target and frequency variation according to the velocity of the target is smaller than zero, in which the frequency variations are calculated through the added down-chirp signal; and measures a distance and a velocity of the target using a frequency difference between the transmission signal calculated through a pair of the up-chirp and down-chirp signals and the reception signal, and a sum of frequency variation according to the distance of the target and frequency variation according to the velocity of the target when the sum of frequency variation according to the distance of the target and frequency variation according to the velocity of the target is greater than zero (alternatively, a case of where the sum is equal to or greater than zero).

Accordingly, even without support of additional hardware: a problem of ghost target detection may be solved through a pairing condition for finding an intersection point through a combination of a pair of the up-chirp and down-chirp signals with the added down-chirp signal when a sum of frequency variation according to the distance of the target and frequency variation according to the velocity of the target is greater than zero (alternatively, a situation in which the sum is equal to or greater than zero), i.e., a case of a general driving situation; target detection is possible in a situation where a sum of frequency variation according to the distance of the target and frequency variation according to the velocity of the target is smaller than zero, for example, in an emergency braking (AEB) situation, through a pairing condition for finding an intersection point through a combination of the down-chirp signal and the added down-chirp signal, except for the up-chirp signal having a negative (−) frequency value; and the probability of ghost occurrence corresponding to the limit of an FMCW scheme may be reduced.

A target measurement method for a radar device for a vehicle, having the configuration as above is described with reference to FIG. 6 as follows.

Figure 6:
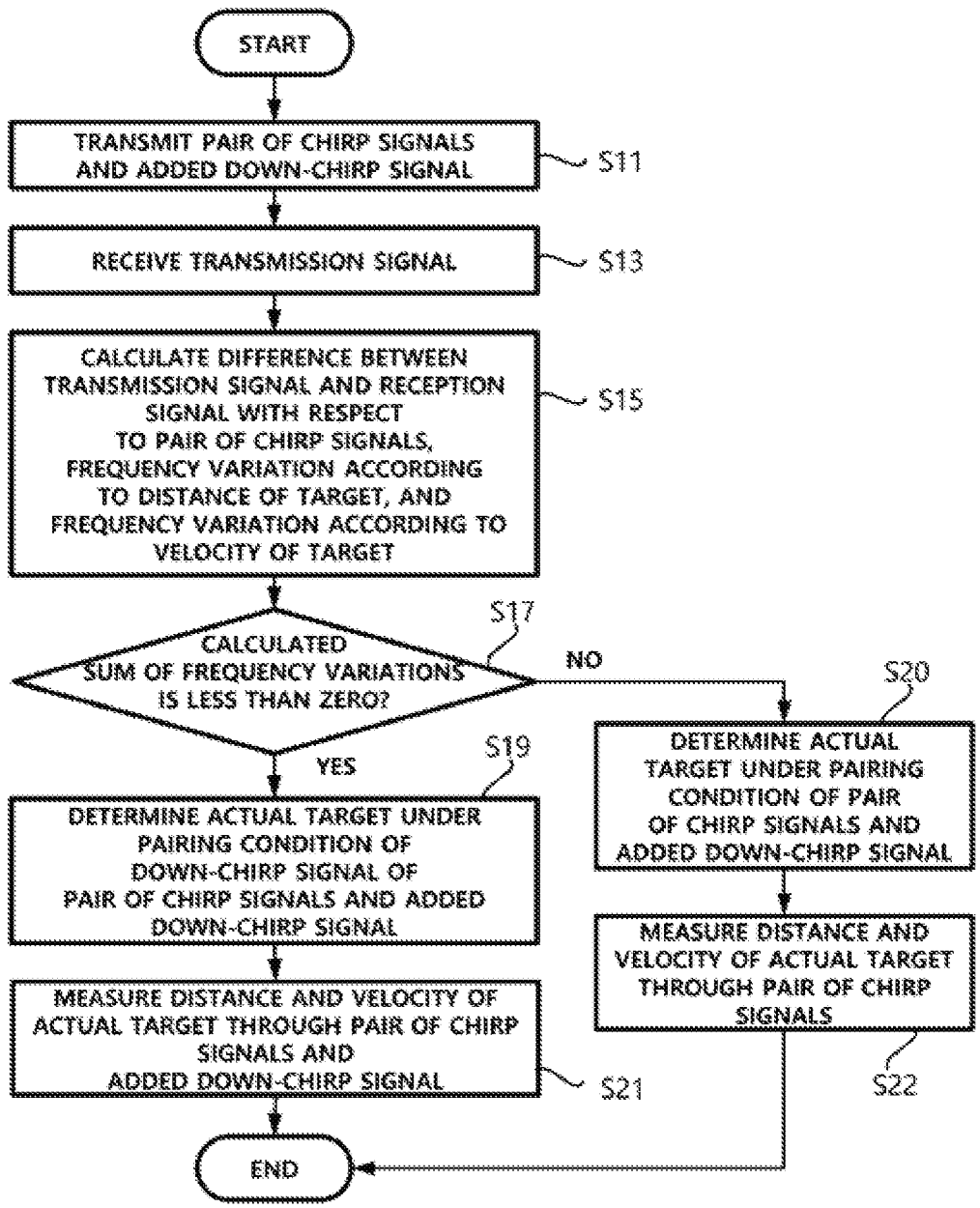
FIG. 6 is an operation flow diagram for describing a target determination method for a radar device for a vehicle according to another embodiment.

FIG. 6 illustrates an operation flow diagram for describing a target determination method for a radar device for a vehicle according to another embodiment.

Referring to FIG. 6, the transmission unit 30 included in a radar device 1 for a vehicle transmits S11, through the transmission antenna 10, a transmission signal including a pair of up-chirp and down-chirp signals having predetermined slopes, and an added down-chirp signal having a slope different from the slope of the above described down-chirp signal.

A pair of the up-chirp and down-chirp signals have slopes different from the slope of the added down-chirp signal. The slopes of a pair of the up-chirp and down-chirp signals are gentle and the slope of the added down-chirp signal is steep.

Figure 7:
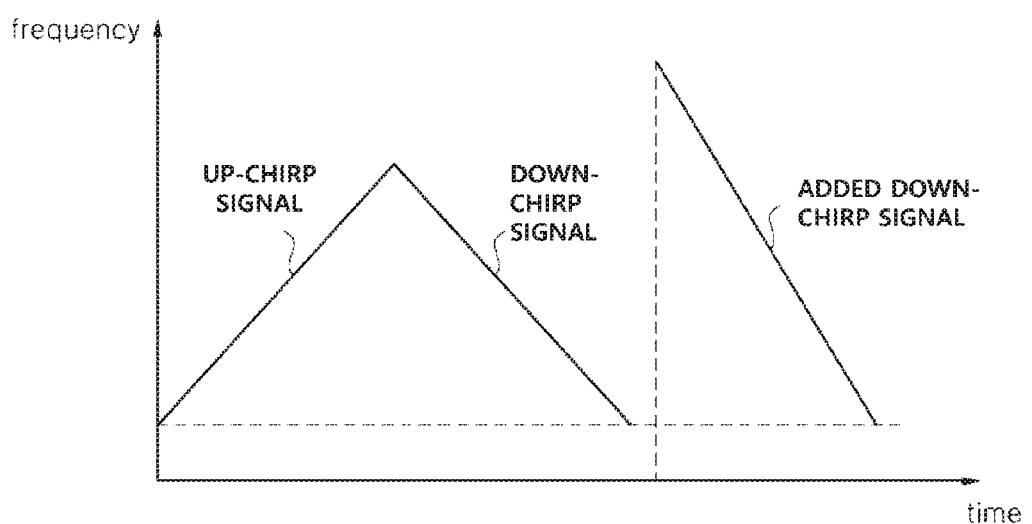
FIG. 7 is a diagram illustrating a pair of up-chirp and down-chirp signals, and an added down-chirp signal having a slope different from the slope of the down-chirp signal of a pair of the chirp signals.

The first and second chirp signals have different slopes, in which the slope of the first chirp signal is gentle while the slope of the second chirp signal is steep. A pair of up-chirp and down-chirp signals corresponding to the first chirp signal and an added down-chirp signal corresponding to the second chirp signal are well illustrated in FIG. 7.

The reception unit 40 included in a radar device 1 for a vehicle receives S13, through the reception antenna 20, a reception signal that is a transmission signal reflected on a target located before a vehicle, in which the transmission signal is transmitted through the transmission antenna 10.

The signal processing unit 50 included in the radar device 1 for a vehicle calculates S15, using a transmission signal through a pair of the up-chirp and down-chirp signals and a reception signal, a frequency difference between the transmission signal and the reception signal, frequency variation according to the distance of the target, and frequency variation according to the velocity of the target. The signal processing unit 50 determines S17 whether a sum of the calculated frequency variation according to the distance of the target and the calculated frequency variation according to the velocity of the target is less than zero.

That is, the signal processing unit 50 determines whether a sum of the calculated frequency variation ($f_R$) according to the distance of the target and the calculated frequency variation ($f_D$) according to the velocity of the target is less than zero as described in EQUATION 1 below.

$$f_R + f_D = \frac{2R \cdot B}{c \cdot T_{sweep}} + \frac{2v}{\lambda} < 0 \qquad [\text{EQUATION 1}]$$

Here, C is the velocity of light, B is a bandwidth ($F_{max} - F_{min}$), R is distance of a target, v is a relative velocity, $\lambda$ is the length of a frequency wavelength, and $T_{sweep}$ is the above described sweep time, that is a time during which an amplitude increases from the minimum value to the maximum value.

Figure 1A:
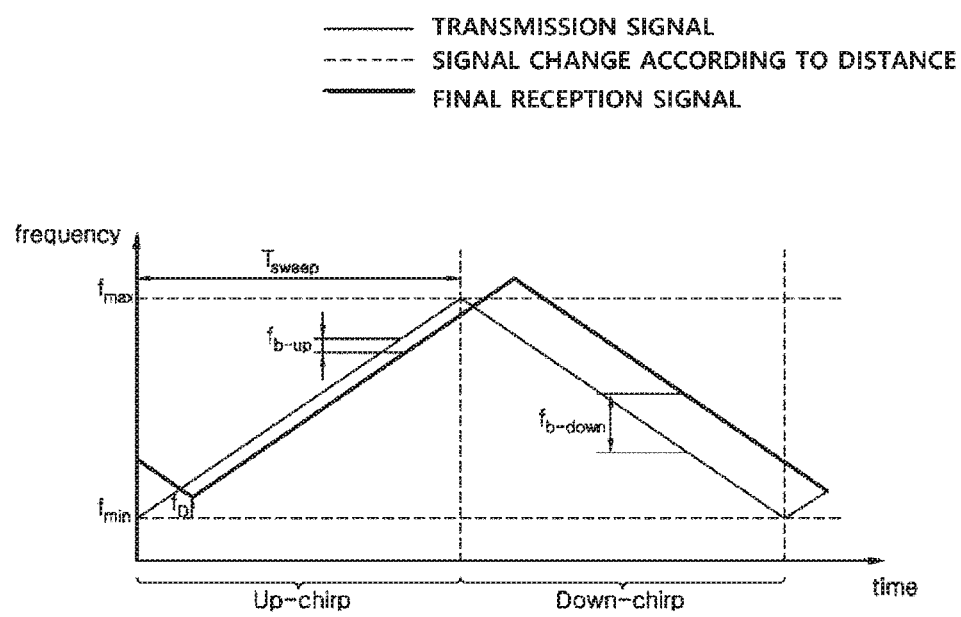
FIG. 1A and FIG. 1B is a diagram displaying a transmission signal using one conventional chirp signal and a reception signal, and a frequency difference between the transmission signal and the reception signal.
Figure 1B:
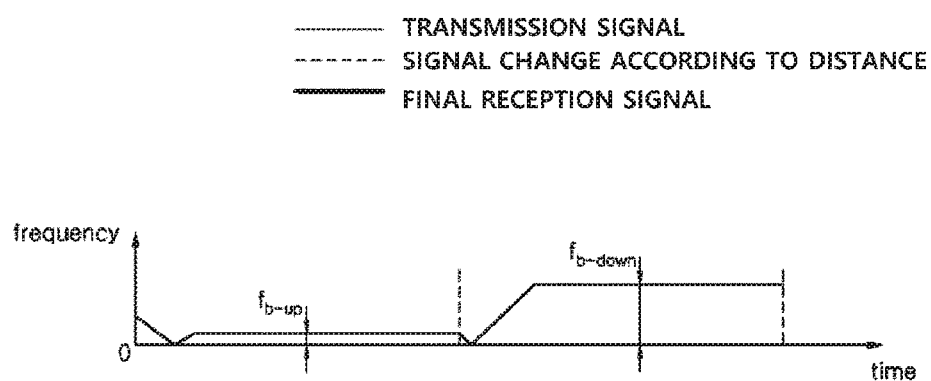
Figure 2:
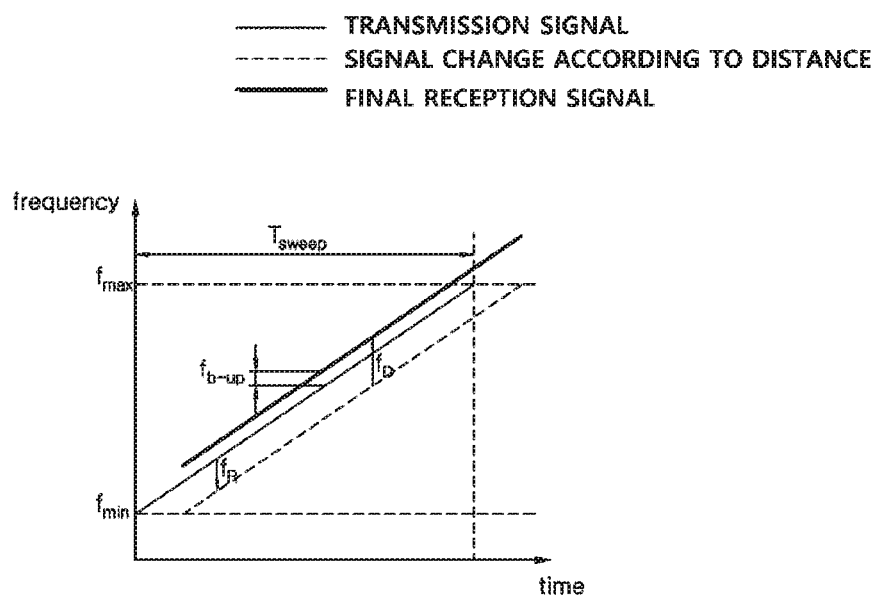
FIG. 2 is a diagram displaying an environment in which a sum of frequency variation according to distance and frequency variation according to velocity has a negative (−) frequency value.
Figure 3:
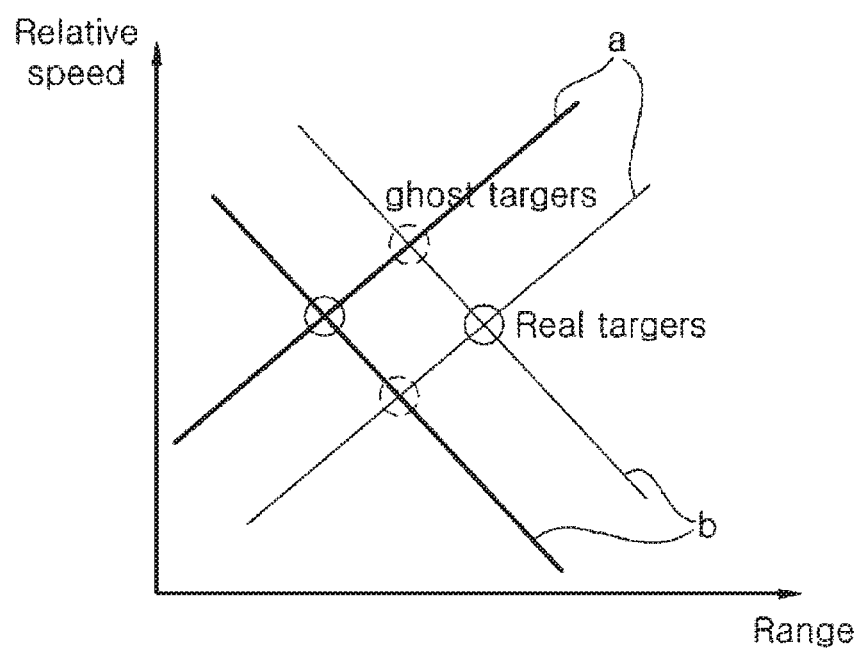
FIG. 3 is a diagram for describing a case where two additional ghost targets are generated by two targets through a conventional radar device for a vehicle.

Based on the result of the determination in step S17, when the sum of frequency variation according to the distance of the target and frequency variation according to the velocity of the target is less than zero, that is, when the sum of frequency variation according to the distance of the target and frequency variation according to the velocity of the target has a negative (−) value as illustrated in FIG. 1A, the signal processing unit 50 determines S19 an actual target under a pairing condition for finding an intersection point at which the down-chirp signal meets the added down-chirp signal.

Figure 8:
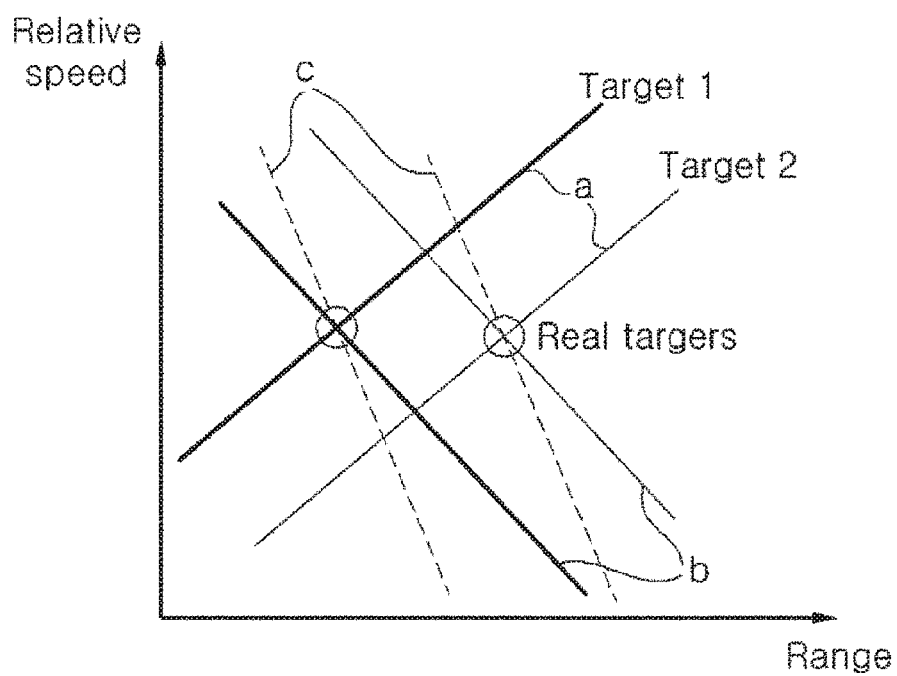
FIG. 8 is a diagram illustrating a state in which two ghost targets are eliminated through a pair of added down-chirp signals.

FIG. 8 displays a relative velocity and a distance of a target that are calculated based on a frequency difference between a transmission signal and a reception signal, which are calculated through a pair of up-chirp and down-chirp signals and an additional down-chirp signal, and frequency variations according to a distance and a velocity of the target.

More specifically, referring to FIG. 8, the signal processing unit 50 determines an actual target under a pairing condition for finding an intersection point at which the down-chirp signal (B) meets the added down-chirp signal (C), illustrated in FIG. 8, when a sum of frequency variation according to the distance of the target and frequency variation according to the velocity of the target is less than zero.

Accordingly, the signal processing unit 50 may determine, as an actual target, a target satisfying a pairing condition for finding an intersection point at which two chirp signals cross each other, so as to secure a detection performance of the target approaching at a high speed in a short distance.

Hereinafter, the signal processing unit 50 measures S21 a distance and a velocity of an actual target determined using a frequency difference between the transmission signal are calculated through a pair of up-chirp and down-chirp signals and the reception signal, and a sum of frequency variation according to a distance of the target and frequency variation according to a velocity of the target, in which the frequency variations are calculated through an added down-chirp signal.

Based on the result of the determination in step S17, when the sum of frequency variation according to the distance of the target and frequency variation according to the velocity of the target is greater than zero (alternatively, a case where the sum is equal to or greater than zero), the signal processing unit 50 determines S20 an actual technical feature under a pairing condition for finding an intersection point at which a pair of the up-chirp and down-chirp signals and the added down-chirp signal meet.

That is, the signal processing unit 50 may determine an actual target under a pairing condition for finding an intersection point at which a pair of the up-chirp signal (A) and the down-chirp signal (B), and the added down-chirp signal (C) meet, illustrated in FIG. 8.

Accordingly, two ghost targets having occurred in a conventional case where two targets exist may be eliminated by determining, as an actual target, a target satisfying a pairing condition for finding an intersection point at which a pair of the up-chirp and down-chirp signals and the added down-chirp signal meet. Hereinafter, the signal processing unit 50 measures S22 a distance and a velocity of the actual target using a frequency difference between the transmission signal calculated through a pair of up-chirp and down-chirp signals and the reception signal, and a sum of frequency variation according to the distance of the target and frequency variation according to the velocity of the target.

The present disclosure is not limited by the embodiments described above and may be variously modified and changed by those skilled in the art, which is included within the spirit and scope of the present disclosure as defined in the appended claims.

DESCRIPTION OF REFERENCE NUMERALS

10: Transmission antenna
20: Reception antenna
30: Transmission unit
40 Reception unit
50: Signal processing unit
51: Calculation unit
52: Determination unit
53: Target determination unit

What is claimed is:

1. An Frequency-modulated continuous-wave (FMCW)-type radar device for a vehicle, including a transmission antenna and a reception antenna that are installed in a vehicle to detect a target located before the vehicle, the FMCW-type radar device for a vehicle, comprising:
    a transmission unit configured to transmit, through the transmission antenna, a transmission signal consisting of, in a continuous sequence, a pair of up-chirp and down-chirp signals having predetermined slopes, and an added down-chirp signal having a slope different from the predetermined slopes;
    a reception unit configured to receive, through the reception antenna, a reception signal that is the transmission signal reflected and returning from the target located before the vehicle, wherein the transmission signal is transmitted by the transmission unit; and
    a signal processing unit configured to determine, as an actual target, a target satisfying a pairing condition for finding an intersection point through a combination of at least one of a pair of the up-chirp and down-chirp signals acquired using a frequency difference between the transmission signal and the reception signal with the added chirp signal,
    wherein a period of the down-chirp signal is configured to be one-half of a period of a pair of the up-chirp and down-chirp signals, and
    wherein the signal processing unit comprises:
        a determination unit configured to determine whether a sum of the calculated frequency variation according to the distance of the target and the calculated frequency variation according to the velocity of the target is less than zero; and
        a target determination unit configured to:
            determine, as an actual target, a target satisfying a pairing condition for finding an intersection point at which the down-chirp signal meets the added down-chirp signal when the sum is less than zero; and
            determine, as an actual target, a target satisfying a pairing condition for finding an intersection point at which a pair of the up-chirp and down-chirp signals and the added down-chirp signal meet when the sum is equal to or greater than zero, based on the result of the determination by the determination unit.

2. The FMCW-type radar device for a vehicle of claim 1, wherein the signal processing unit comprises a calculation unit configured to calculate a frequency difference between the transmission signal through the pair of the up-chirp and down-chirp signals and the reception signal, frequency variation according to a distance of the target, and frequency variation according to a velocity of the target.

3. The FMCW-type radar device for a vehicle of claim 1, wherein, in relation to the added down-chirp signal, a frequency modulation range of a pair of the up-chirp and down-chirp signals is configured to be narrower than a frequency modulation range of the added down-chirp signal.

4. The FMCW-type radar device for a vehicle of claim 1, wherein the target determination unit is configured to:

measure a distance and a velocity of the target using a frequency difference between the transmission signal through a pair of the up-chirp and down-chirp signals and the reception signal, and a sum of frequency variation according to the distance of the corresponding target and frequency variation according to the velocity of the corresponding target when the sum is less than zero, wherein the frequency variations are calculated through the added down-chirp signal; and measure a distance and a velocity of the target using a frequency difference between the transmission signal through a pair of the up-chirp and down-chirp signals and the reception signal, and a sum of frequency variation according to the distance of the corresponding target and frequency variation according to the velocity of the corresponding target when the sum is equal to or greater than zero.

5. A target determination method for an Frequency-modulated continuous-wave (FMCW)-type radar device for a vehicle, including a transmission antenna and a reception antenna that are installed in a vehicle to detect a target located before the vehicle, the target determination method for a radar device for a vehicle, comprising:

transmitting, through the transmission antenna, a transmission signal consisting of, in a continuous sequence, a pair of up-chirp and down-chirp signals having predetermined slopes, and an added down-chirp signal having a slope different from the predetermined slopes;

receiving, through the reception antenna, a reception signal that is the transmission signal reflected and returning from the target located before the vehicle, wherein the transmission signal is transmitted by the transmission unit; and determining, as an actual target, a target satisfying a pairing condition for finding an intersection point through a combination of at least one of a pair of the up-chirp and down-chirp signals acquired using a frequency difference between the transmitted transmission signal and the received reception signal with the added chirp signal, wherein a period of the down-chirp signal is configured to be one-half of a period of a pair of the up-chirp and down-chirp signals, and wherein determining the target as an actual target comprises:

determining whether a sum of frequency variation according to the distance of the target and frequency variation according to the velocity of the target is less than zero, wherein the frequency variations are calculated through a pair of the up-chirp and down-chirp signals; and determining, as an actual target, a target satisfying a pairing condition for finding an intersection point at which the down-chirp signal meets the added down-chirp signal when the sum is less than zero, and determining, as an actual target, a target satisfying a pairing condition for finding an intersection point at which a pair of the up-chirp and down-chirp signals and the added down-chirp signal meet when the sum is greater than zero, based on the result of determining whether the sum is less than zero.

6. The target determination method of claim 5, wherein, in relation to the added down-chirp signal, a frequency modulation range of a pair of the up-chirp and down-chirp signals is configured to be narrower than a frequency modulation range of the added down-chirp signal.

7. The target determination method of claim 5, wherein determining the target as an actual target comprises:

measuring a distance and a velocity of the target using a frequency difference between the transmission signal through a pair of the up-chirp and down-chirp signals and the reception signal, and a sum of frequency variation according to the distance of the corresponding target and frequency variation according to the velocity of the corresponding target when the sum is less than zero, wherein the frequency variations are calculated through the added down-chirp signal; and measuring a distance and a velocity of the target using a frequency difference between the transmission signal through a pair of the up-chirp and down-chirp signals and the reception signal, and a sum of frequency variation according to the distance of the corresponding target and frequency variation according to the velocity of the corresponding target when the sum is equal to or greater than zero.

\* \* \* \* \*